(12) United States Patent
Dennig et al.

(10) Patent No.: US 7,929,118 B2
(45) Date of Patent: Apr. 19, 2011

(54) METHOD FOR GEODETIC MONITORING OF RAILS

(75) Inventors: Dirk Dennig, Essen (DE); Andreas Schmidt-Boellert, Rellingen (DE)

(73) Assignee: Thyssenkrupp GFT Gleistechnik GmbH, Essen (DE)

( * ) Notice: Subject to any disclaimer, the term of this patent is extended or adjusted under 35 U.S.C. 154(b) by 199 days.

(21) Appl. No.: 12/319,303

(22) Filed: Jan. 6, 2009

(65) Prior Publication Data

US 2010/0171943 A1 Jul. 8, 2010

(51) Int. Cl.
*G01C 3/08* (2006.01)
(52) U.S. Cl. ......... 356/4.01; 356/4.1; 356/5.1; 356/5.15
(58) Field of Classification Search ........ 356/3.01–28.5, 356/139.01–139.1
See application file for complete search history.

(56) References Cited

U.S. PATENT DOCUMENTS

| 5,157,840 A | 10/1992 | Henttinen |
| 2002/0166248 A1* | 11/2002 | Carr et al. ................. 33/287 |
| 2010/0026551 A1* | 2/2010 | Szwilski et al. .............. 342/22 |

FOREIGN PATENT DOCUMENTS

| DE | 212 931 | 8/1984 |
| DE | 38 08 972 | 10/1989 |
| DE | 689 14 828 | 8/1994 |
| DE | 197 47 872 | 5/1999 |
| DE | 10 2006 042 496 | 4/2008 |

* cited by examiner

*Primary Examiner* — Thomas H Tarcza
*Assistant Examiner* — Luke D Ratcliffe
(74) *Attorney, Agent, or Firm* — Jordan and Hamburg LLP

(57) ABSTRACT

Method for geodetic monitoring of rails provided for conveying devices in that stationed at least in the area of one rail end is a tachymeter with spatial reference, placed on the rail to be checked is a rail measuring vehicle that travels the rail alone for measuring the rail when the rail is not loaded, and that for measuring the rail when loaded is driven at the same speed as the conveying device, the measuring points during the measurement being recorded continuously when the rail is loaded and/or unloaded.

10 Claims, 2 Drawing Sheets

METHOD FOR GEODETIC MONITORING OF RAILS

BACKGROUND OF THE INVENTION

The invention relates to a method for geodetic monitoring of rails on which traveling conveying devices move.

DE 197 47 872 C2 discloses a system for measuring rails, in particular running rails for cranes, storage/retrieval machines, running-wheel blocks, and the like, having arranged on the rail a transmitter unit that has a laser with at least one laser beam that runs in the longitudinal direction of the rail, and having a drivable receiver unit that can travel on the same rail in the longitudinal direction of the rail, and having at least one photoreceiver that faces the laser beam and that generates an output signal triggered by the impinging laser beam, making it possible to determine the location of the laser beam in a vertical measuring surface oriented transverse to the longitudinal direction of the rails, a proximity sensor for determining the change in distance between the transmitter unit and the receiver unit being provided. The photoreceiver has a rectangular matrix having a plurality of pixels arranged immediately adjacent to one another, the electrical output signals of which are supplied to an electronic evaluation unit that is used to determine the point of impact of the spatially position-stabilized laser beam in the measurement surface using electronic means only by evaluating the pixel output signals. The photoreceiver is an optoelectric camera, and arranged in front of it as measuring surface is a light-permeable scatter diffusing screen that is embodied optically on the matrix of the camera.

SUMMARY OF THE INVENTION

The goal of the inventive subject-matter is to provide an alternative measuring method that is simpler in construction and also permits more rapid comparative measurements and provides the measurement results with spatial reference.

Moreover, a rail measuring vehicle is to be created that is provided for monitoring individual rails and can measure desired parameters of the rails in question.

This object is attained using a method for geodetic monitoring of rails provided for conveying devices in that stationed at least in the area of one rail end is a tachymeter with spatial reference, placed on the rail to be checked is a rail measuring vehicle that travels the rail alone for measuring the rail when the rail is not loaded, and that for measuring the rail when loaded is driven at the same speed as the conveying device, the measuring points during the measurement being recorded continuously when the rail is loaded and/or unloaded.

Advantageous refinements of the inventive method are found in the associated subordinate method claims.

This goal is also attained using a rail measuring vehicle containing at least one running wheel that can be placed on the rail to be measured and that is mechanically linked to a platform receiving a measuring aid/measuring means.

In the following a reinforced concrete beam shall be used as an example as a receiving element for an individual rail for a measuring system for rails. Sleepers, inter alia, could be used just as well.

In particular in the area of port facilities the subsoil receiving the reinforced concrete beam is likely to be poor due to the heavy load from the conveying devices (cranes or the like) that can travel on wide-gauge rails, high fatiguing stresses result for the reinforced concrete beam. Using the inventive geodetic monitoring method, the behavior of the rails placed on the reinforced concrete beam is monitored and conclusions are drawn regarding possible settling and deformation.

For checking the assumptions made in the previous static calculations, it is necessary to verify the effects of stresses from external loads and forces (temperature). If monitoring establishes that the reinforced concrete beam has settled significantly or that the rail has deformed significantly, this can be compensated by using compensation plates or lifting the reinforced concrete beam locally. When using sleepers placed transverse to the rails as a rail receiving system, stoppers or similar suitable measures are used.

For checking the gauges and heights, the rails are measured individually. Each rail can be up to 400 m long. If needed, longer rails can also be used on appropriate beams or sleepers. In order to detect and document local depressions, the rail in question is also measured while loaded.

The measurement is performed with a highly accurate geodetic tachymeter. The points to be measured are signaled by means of a small self-driving and where necessary remote-controlled rail measuring vehicle, both with the rails loaded and with the rails unloaded.

If significant settling is registered in the measurements with the rails loaded, it may be helpful for the stationary conveying device to take additional measurements of the settling depression.

Each rail is preferably measured from both sides in a surveying work step. The individual rails are measured from the end faces of the crane runway. The measurement is tied by position and height to a data processing system and is therefore unaffected by local settling.

Gauges can thus be derived directly and the measurements can be compared to one another over an extended period of time.

The measurement points are recorded during the measurement while loaded and unloaded, in the so-called tracking mode, which means that the target is tracked continuously and the position is registered.

The detection speed of the rail measuring vehicle determines the point interval. Given a 0.3 to 0.5 second time span between detection of two measurement points, the result is a 0.3 to 0.5 m point interval in the longitudinal direction of the rail at a travelling speed of 1 m/s.

For the measurement when unloaded, the rail measuring vehicle travels for instance by remote control over the rail, while the conveying device is parked in a waiting position.

During the measurement when loaded, the rail measuring vehicle used travels a short distance from the undercarriage of the conveying device (for instance the crane or its undercarriage) and thus at the same speed as the conveying device so that the rail can be recorded. To enhance accuracy and exclude target axis errors and tilt axis errors, it makes sense for there to be one forward travel and one backward travel by the rail vehicle when loaded and when unloaded during an observation in the first and second lens positions of the tachymeter.

A precision tachymeter having an interior angle measurement accuracy of at least 0.15 mgon and automatic target tracking is used for the measurement.

The reflector (measuring aid) is transported using the rail measuring vehicle, which has the following properties:
  self-propelled, i.e. remote-controlled
  light-weight
  compact
  weather-proof (humidity, cold, heat, dust)
  stable
  long battery life
  option to couple the rail measuring vehicle to the conveying device a marking on the rail measuring vehicle ensures that it is always positioned on the same rail side.

High demands are placed on accuracy in the transverse/longitudinal directions and height of the rail. The rail measuring device can be operated at a speed of up to 1 m/s to attain adequate accuracy.

The following advantages are associated with the inventive subject-matter:

Overall measuring time is minimized

Rails are measured in two load conditions

Device errors excluded (target axis errors and tilt axis errors)

Use of standard measuring devices (precision tachymeter).

The inventive subject-matter is illustrated using an exemplary embodiment and is described as follows.

DETAILED DESCRIPTION OF THE INVENTION

Figure 1:
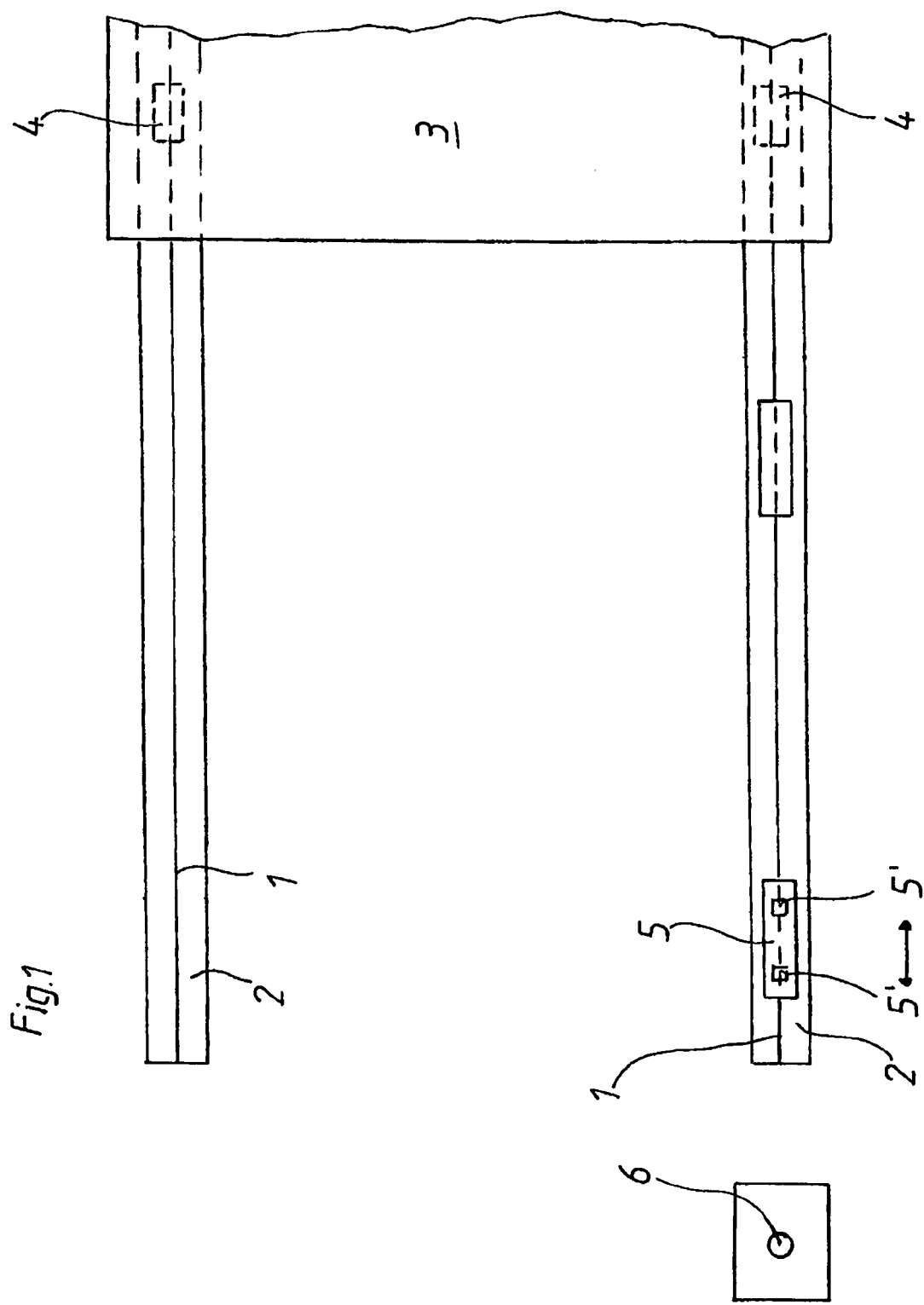
FIG. 1 Top-view principle sketch for illustrating the inventive method.

FIG. 1 provides a principle sketch that can be used to illustrate the inventive method. Depicted are rails 1 that in this example are placed on reinforced concrete beams 2 that are spaced apart and that run longitudinally. The reinforced concrete beams 2 are placed parallel to one another with a larger gauge than the tracks 1 and receive a conveying device 3 (only indicated). The conveying device 3 can be for instance a port terminal system such as a crane or the like and has a correspondingly heavy service weight so that even when not loaded there are high forces acting on the rails 1. These forces increase even further during loading and unloading of transport containers such as ships, railcars, and the like. The conveying device 3 has running wheels 4 that are seated on the rails 1. In particular in the area of port facilities, reinforced concrete beams 2 that are laid have a tendency to sink under heavy loads. In the same manner there is wear on each rail 1 due to the high service and working weight of the conveying device. Breakdowns of conveying devices due to reinforced concrete beams 2 that have sunk and (partially) worn rails 1 are very cost-intensive so that checking the condition of the rails 1/reinforced concrete beams 2 is necessary at certain time intervals. Moreover, it is necessary to maintain appropriate documentation that permits the measurement results obtained at intervals to be compared. A rail measuring vehicle 5 that is placed on one rail 1 is used for this purpose. For checking the rail 1 when unloaded, the conveying device 3 is parked for instance at one end of the rails 1 and the rail measuring vehicle 5 is moved at a defined speed in the longitudinal direction of the rails. A high-precision tachymeter 6 is positioned at the other end of the rail. The rail measuring vehicle 5 has running wheels 5' that roll on the rail 1. Not depicted is an electric drive, via which the rail measuring vehicle can be driven in the longitudinal direction of the rail, for instance by remote control.

Figures 2, 3:
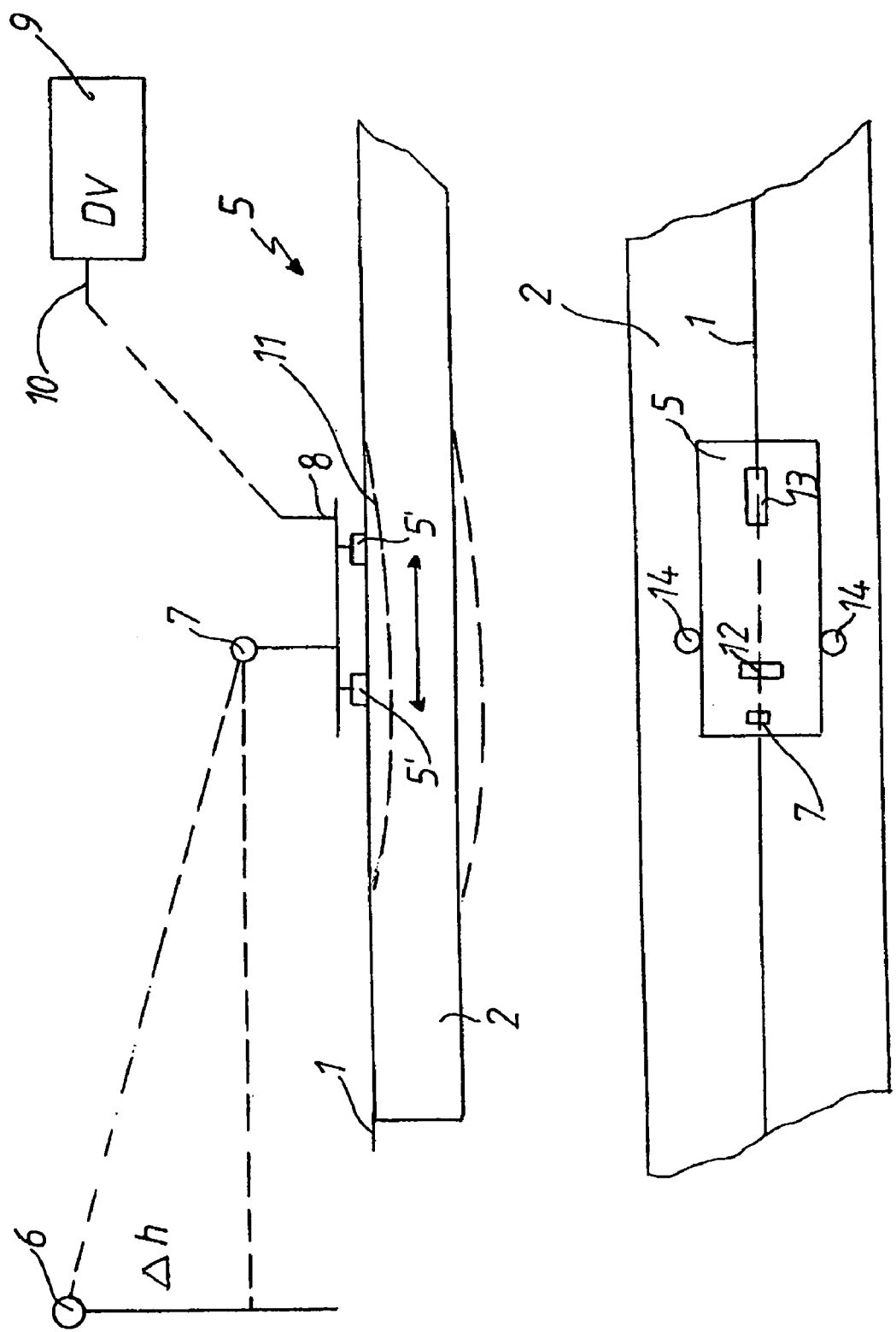
FIG. 2 Principle sketch of rail measuring vehicle mechanically linked to a tachyrmeter and a data processing system.
FIG. 3 Top view of the rail measuring vehicle with indicated measuring aids/measuring means.

FIG. 2 depicts the principle of the measuring system so that the inventive method can be visualized in a side view. The rail measuring vehicle 5 has a reflector 7 (measuring aid) that is pointed toward the tachymeter 6. The rail measuring vehicle is connected via an antenna 8 to a data processing system 9 that also has an antenna 10. The reinforced concrete beam 2 on which the rail 1 is borne can also be seen. The broken lines indicate a sunken section 11 of the reinforced concrete beam 2. As this sunken area 11 is passed over, a corresponding measuring process takes place between the tachymeter 6 and the reflector 7, and this measuring process can be used to determine a height difference $\Delta h$. This found measured value is transmitted to the data processing system 9 and the settled area 11 is documented. In a subsequent step the rail 1 can now either be packed with plates (not shown) or if there is more major settling 11 the reinforced concrete beams 2 can be raised with packing.

FIG. 3 provides a top view of the rail measuring vehicle 5. The rail 1 and the reinforced concrete beam 2 that receives the rail 1 can be seen. The measuring aids (reflector 7) and additional measuring means 12, 13, 14 and the antenna 8 are only indicated.

The measuring means 12 embodied as a sensor measures the inclination transverse to the rail 1. The measuring means 13 is also formed by a sensor and measures the inclination in the longitudinal direction of the rail and supplements the tachymeter measurement, as it is addressed in FIGS. 1 and 2.

Additional measuring means 14 in the form of sensors measure for instance the rail height, i.e. the distance from the rail 1 to the reinforced concrete beam 2. As indicated in FIG. 2, the individual measured values are transmitted via the antenna 8 to the data processing system and documented.

The invention claimed is:

1. Method for geodetic monitoring of a rail for traversal by a conveying device, the method comprising placing a tachymeter in the vicinity of an end of the rail, placing on the rail for travel therealong a rail measuring vehicle, driving the rail measuring vehicle along the length of the rail under two conditions, while measuring at intervals by means of the tachymeter, and recording, height of a reference location indicator affixed to the rail measuring vehicle, one of the two conditions being when the rail is not supporting the conveying device and the other condition being when the rail is supporting the conveying device and, during said other condition, driving the measuring vehicle at the same speed as the conveying device.

2. Method according to claim 1, wherein during said other condition, the measuring vehicle is driven a slight distance from an undercarriage of the conveying device.

3. Method according to claim 2, wherein the measuring vehicle is connected to the conveying device.

4. Method according to claim 2, wherein the measuring vehicle is connected to the undercarriage of the conveying device.

5. Method according to claim 1, wherein during the first condition the conveying device is parked in a waiting position and the rail measuring vehicle is driven by remote control.

6. Method according to claim 1, wherein the reference location indicator comprises a reflector.

7. Method according to claim 1, wherein the rail being monitored rests on a concrete beam and the method further comprises measuring, by means of one or more measuring devices carried by the rail measuring vehicle, traverse and/or longitudinal inclination of the rail and/or height of the rail with respect to the reinforced concrete beam.

8. A system for geodetic monitoring of a rail for traversal by a conveying device, the system comprising a rail measuring vehicle including at least one wheel for running on the track, a reference location indicator affixed to the rail measuring vehicle, one or more measuring devices carried by the rail measuring vehicle for determining traverse and/or longitudinal inclination of the rail and/or height of the rail with respect to a reinforced concrete beam supporting the rail, and a tachymeter positioned relative to the rail so as to be offset from the rail at a location spaced from the rail measuring vehicle and not carried by the rail measuring vehicle, the reference location indicator comprising a reflector pointed toward the tachymeter.

9. A system according to claim 8, wherein each of the measuring devices comprises a sensor.

10. A system according to claim 8 or 9, further comprising a first antenna carried by the rail measuring vehicle, and a remote data processing system including a second antenna for receiving respective values measured by the respective measuring devices which values are transmitted via the first antenna.

\* \* \* \* \*